United States Patent
Cao et al.

(10) Patent No.: US 11,656,373 B2
(45) Date of Patent: May 23, 2023

(54) METHODS AND SYSTEMS FOR FORMING IMAGES WITH RADIATION

(71) Applicant: SHENZHEN XPECTVISION TECHNOLOGY CO., LTD., Shenzhen (CN)

(72) Inventors: Peiyan Cao, Shenzhen (CN); Yurun Liu, Shenzhen (CN)

(73) Assignee: SHENZHEN XPECTVISION TECHNOLOGY CO., LTD., Shenzhen (CN)

( * ) Notice: Subject to any disclaimer, the term of this patent is extended or adjusted under 35 U.S.C. 154(b) by 87 days.

(21) Appl. No.: 17/179,858

(22) Filed: Feb. 19, 2021

(65) Prior Publication Data
US 2021/0173102 A1    Jun. 10, 2021

Related U.S. Application Data

(63) Continuation of application No. PCT/CN2018/109408, filed on Oct. 9, 2018.

(51) Int. Cl.
G01T 1/24     (2006.01)
G06T 5/00     (2006.01)

(52) U.S. Cl.
CPC ............. *G01T 1/247* (2013.01); *G06T 5/001* (2013.01); *G06T 2207/10116* (2013.01)

(58) Field of Classification Search
None
See application file for complete search history.

(56) References Cited

U.S. PATENT DOCUMENTS

| | | |
|---|---|---|
| 2011/0106473 A1 | 5/2011 | Tsai et al. |
| 2011/0243305 A1 | 10/2011 | Tada |
| 2011/0297838 A1 | 12/2011 | Wangerin et al. |
| 2014/0326894 A1 | 11/2014 | Abraham et al. |
| 2015/0189194 A1 | 7/2015 | Tajima |
| 2017/0098317 A1* | 4/2017 | Qi .................. G06T 11/008 |
| 2017/0350995 A1 | 12/2017 | Stanchina et al. |

FOREIGN PATENT DOCUMENTS

| | | |
|---|---|---|
| CN | 102670232 A | 9/2012 |
| CN | 105899137 A | 8/2016 |
| CN | 106061393 A | 10/2016 |
| CN | 108445525 A | 8/2018 |
| TW | 201816424 A | 5/2018 |

* cited by examiner

*Primary Examiner* — Edwin C Gunberg
(74) *Attorney, Agent, or Firm* — IPro, PLLC; Qian Gu

(57) ABSTRACT

Disclosed herein is a method comprising: obtaining a signal at a pixel in an array of pixels of a radiation detector, wherein the signal is generated from radiation incident on the radiation detector; obtaining a corrected signal by correcting the signal with a combination of a set of reference signals generated from the radiation at a set of reference pixels in the array, wherein a set of weights are respectively applied to the set of reference signals in the combination; and forming an image based on the corrected signal; wherein the set of weights is a function of a location of the pixel with respect to the array.

17 Claims, 20 Drawing Sheets

METHODS AND SYSTEMS FOR FORMING IMAGES WITH RADIATION

BACKGROUND

Radiation detectors may be devices used to measure the flux, spatial distribution, spectrum or other properties of radiations.

Radiation detectors may be used for many applications. One important application is imaging. Radiation imaging is a radiography technique and can be used to reveal the internal structure of a non-uniformly composed and opaque object such as the human body.

Early radiation detectors for imaging include photographic plates and photographic films. A photographic plate may be a glass plate with a coating of light-sensitive emulsion. Although photographic plates were replaced by photographic films, they may still be used in special situations due to the superior quality they offer and their extreme stability. A photographic film may be a plastic film (e.g., a strip or sheet) with a coating of light-sensitive emulsion.

In the 1980s, photostimulable phosphor plates (PSP plates) became available. A PSP plate may contain a phosphor material with color centers in its lattice. When the PSP plate is exposed to radiation, electrons excited by radiation are trapped in the color centers until they are stimulated by a laser beam scanning over the plate surface. As the plate is scanned by laser, trapped excited electrons give off light, which is collected by a photomultiplier tube. The collected light is converted into a digital image. In contrast to photographic plates and photographic films, PSP plates can be reused.

Another kind of radiation detectors are radiation image intensifiers. Components of a radiation image intensifier are usually sealed in a vacuum. In contrast to photographic plates, photographic films, and PSP plates, radiation image intensifiers may produce real-time images, i.e., do not require post-exposure processing to produce images. Radiation first hits an input phosphor (e.g., cesium iodide) and is converted to visible light. The visible light then hits a photocathode (e.g., a thin metal layer containing cesium and antimony compounds) and causes emission of electrons. The number of emitted electrons is proportional to the intensity of the incident radiation. The emitted electrons are projected, through electron optics, onto an output phosphor and cause the output phosphor to produce a visible-light image.

Scintillators operate somewhat similarly to radiation image intensifiers in that scintillators (e.g., sodium iodide) absorb radiation and emit visible light, which can then be detected by a suitable image sensor for visible light. In scintillators, the visible light spreads and scatters in all directions and thus reduces spatial resolution. Reducing the scintillator thickness helps to improve the spatial resolution but also reduces absorption of radiation. A scintillator thus has to strike a compromise between absorption efficiency and resolution.

Semiconductor radiation detectors largely overcome this problem by direct conversion of radiation into electric signals. A semiconductor radiation detector may include a semiconductor layer that absorbs radiation in wavelengths of interest. When a particle of radiation is absorbed in the semiconductor layer, multiple charge carriers (e.g., electrons and holes) are generated and swept under an electric field towards electric contacts on the semiconductor layer. Cumbersome heat management required in currently available semiconductor radiation detectors (e.g., Medipix) can make a detector with a large area and a large number of pixels difficult or impossible to produce.

SUMMARY

Disclosed herein is a method comprising: obtaining a signal at a pixel in an array of pixels of a radiation detector, wherein the signal is generated from radiation incident on the radiation detector; obtaining a corrected signal by correcting the signal with a combination of a set of reference signals generated from the radiation at a set of reference pixels in the array, wherein a set of weights are respectively applied to the set of reference signals in the combination; and forming an image based on the corrected signal; wherein the set of weights is a function of a location of the pixel with respect to the array.

According to an embodiment, each pixel in the array of pixels encompasses a portion of a radiation absorption layer of the radiation detector.

According to an embodiment, the set of weights is a function of a thickness of the radiation absorption layer.

According to an embodiment, the radiation absorption layer comprises silicon.

According to an embodiment, the signal is generated from charge carriers produced in the radiation absorption layer by the radiation.

According to an embodiment, the set of weights is a function of a direction of propagation of the radiation at the pixel.

According to an embodiment, the set of weights is a function of relative positions of the set of reference pixels with respect to the pixel.

According to an embodiment, the pixel is a member of the set of reference pixels.

According to an embodiment, the radiation is X-ray or gamma ray.

According to an embodiment, the signal and the set of reference signals are generated during the same time period.

According to an embodiment, the combination is a sum of the set of reference signals with the set of weights applied thereto.

According to an embodiment, the signal represents an intensity of the radiation at the pixel.

According to an embodiment, the radiation detector comprises a radiation absorption layer and an electronics layer; wherein the radiation absorption layer comprises an electrode; wherein the electronics layer comprises an electronics system; wherein the electronics system comprises: a first voltage comparator configured to compare a voltage of the electrode to a first threshold, a second voltage comparator configured to compare the voltage to a second threshold, a counter configured to register a number of radiation photons reaching the radiation absorption layer, and a controller; wherein the controller is configured to start a time delay from a time at which the first voltage comparator determines that an absolute value of the voltage equals or exceeds an absolute value of the first threshold; wherein the controller is configured to activate the second voltage comparator during the time delay; wherein the controller is configured to cause the number registered by the counter to increase by one, if the second voltage comparator determines that an absolute value of the voltage equals or exceeds an absolute value of the second threshold.

According to an embodiment, the electronics system further comprises an integrator electrically connected to the electrode, wherein the integrator is configured to collect charge carriers from the electrode.

According to an embodiment, the controller is configured to activate the second voltage comparator at a beginning or expiration of the time delay.

According to an embodiment, the electronics system further comprises a voltmeter, wherein the controller is configured to cause the voltmeter to measure the voltage upon expiration of the time delay.

According to an embodiment, the controller is configured to determine a radiation photon energy based on a value of the voltage measured upon expiration of the time delay.

According to an embodiment, the controller is configured to connect the electrode to an electrical ground.

According to an embodiment, a rate of change of the voltage is substantially zero at expiration of the time delay.

According to an embodiment, a rate of change of the voltage is substantially non-zero at expiration of the time delay.

Disclosed here is a computer program product comprising a non-transitory computer readable medium having instructions recorded thereon, the instructions when executed by a computer implementing a method of any one of above mentioned.

Disclosed herein is a system comprising: a radiation detector configured to generate a signal at a pixel in an array of pixels of the radiation detector from radiation incident on the radiation detector; a processor configured to obtain a corrected signal by correcting the signal with a combination of a set of reference signals generated from the radiation at a set of reference pixels in the array, wherein a set of weights are respectively applied to the set of reference signals in the combination; wherein the processor is configured to form an image based on the corrected signal; wherein the set of weights is a function of a location of the pixel with respect to the array.

According to an embodiment, each pixel in the array of pixels encompasses a portion of a radiation absorption layer of the radiation detector.

According to an embodiment, the set of weights is a function of a thickness of the radiation absorption layer.

According to an embodiment, the radiation absorption layer comprises silicon.

According to an embodiment, the signal is generated from charge carriers produced in the radiation absorption layer by the radiation.

According to an embodiment, the set of weights is a function of a direction of propagation of the radiation at the pixel.

According to an embodiment, the set of weights is a function of relative positions of the set of reference pixels with respect to the pixel.

According to an embodiment, the pixel is a member of the set of reference pixels.

According to an embodiment, the radiation is X-ray or gamma ray.

According to an embodiment, the signal and the set of reference signals are generated during the same time period.

According to an embodiment, the combination is a sum of the set of reference signals with the set of weights applied thereto.

According to an embodiment, the signal represents an intensity of the radiation at the pixel.

DETAILED DESCRIPTION

Figure 1A:
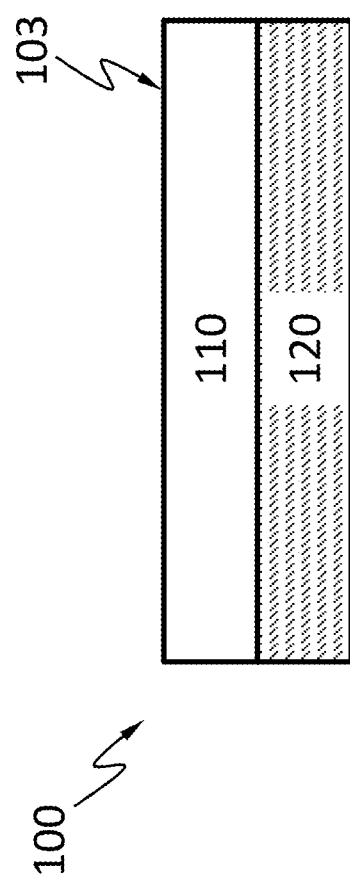
FIG. 1A schematically shows a cross-sectional view of a radiation detector, according to an embodiment.

FIG. 1A schematically shows a cross-sectional view of a radiation detector 100, according to an embodiment. The radiation detector 100 may include a radiation absorption layer 110 and an electronics layer 120 (e.g., an ASIC) for processing or analyzing electrical signals incident radiation generates in the radiation absorption layer 110. In an embodiment, the radiation detector 100 does not comprise a scintillator. The radiation absorption layer 110 may include a semiconductor material such as, silicon, germanium, GaAs, CdTe, CdZnTe, or a combination thereof. The semiconductor may have a high mass attenuation coefficient for the radiation energy of interest. The surface 103 of the radiation absorption layer 110 distal from the electronics layer 120 is configured to receive radiation. The radiation may be X-ray or gamma ray.

Figure 1B:
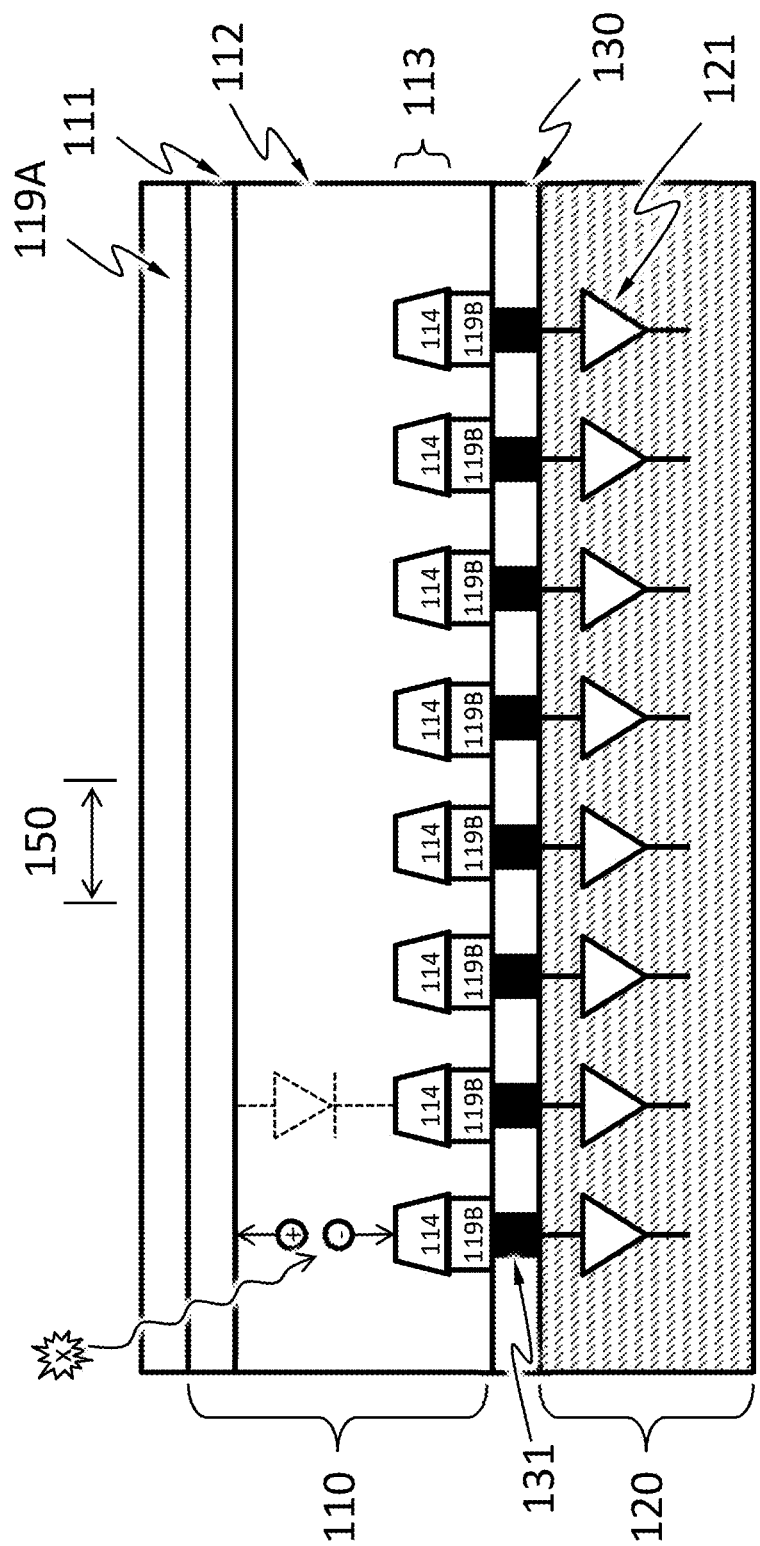
FIG. 1B schematically shows a detailed cross-sectional view of the detector, according to an embodiment.

As shown in a detailed cross-sectional view of the radiation detector 100 in FIG. 1B, according to an embodiment, the radiation absorption layer 110 may include one or more diodes (e.g., p-i-n or p-n) formed by a first doped region 111, one or more discrete regions 114 of a second doped region 113. The second doped region 113 may be separated from the first doped region 111 by an optional the intrinsic region 112. The discrete regions 114 are separated from one another by the first doped region 111 or the intrinsic region 112. The first doped region 111 and the second doped region 113 have opposite types of doping (e.g., region 111 is p-type and region 113 is n-type, or region 111 is n-type and region 113 is p-type). In the example in FIG. 1B, each of the discrete regions 114 of the second doped region 113 forms a diode with the first doped region 111 and the optional intrinsic region 112. Namely, in the example in FIG. 1B, the radiation absorption layer 110 has a plurality of diodes having the first doped region 111 as a shared electrode. The first doped region 111 may also have discrete portions.

When a particle of radiation hits the radiation absorption layer 110 including diodes, the particle of radiation may be absorbed and generate one or more charge carriers by a number of mechanisms. A particle of radiation may generate 10 to 100000 charge carriers. The charge carriers may drift to the electrodes of one of the diodes under an electric field. The field may be an external electric field. The electric contact 119B may include discrete portions each of which is in electrical contact with the discrete regions 114. In an embodiment, the charge carriers may drift in directions such that the charge carriers generated by a single particle of radiation are not substantially shared by two different discrete regions 114 ("not substantially shared" here means less than 2%, less than 0.5%, less than 0.1%, or less than 0.01% of these charge carriers flow to a different one of the discrete regions 114 than the rest of the charge carriers). Charge carriers generated by a particle of radiation incident around the footprint of one of these discrete regions 114 are not substantially shared with another of these discrete regions 114. A pixel 150 associated with a discrete region 114 may be an area around the discrete region 114 in which substantially all (more than 98%, more than 99.5%, more than 99.9%, or more than 99.99% of) charge carriers generated by a particle of radiation incident therein at an angle of incidence of 0° flow to the discrete region 114. Namely, less than 2%, less than 1%, less than 0.1%, or less than 0.01% of these charge carriers flow beyond the pixel.

Figure 1C:
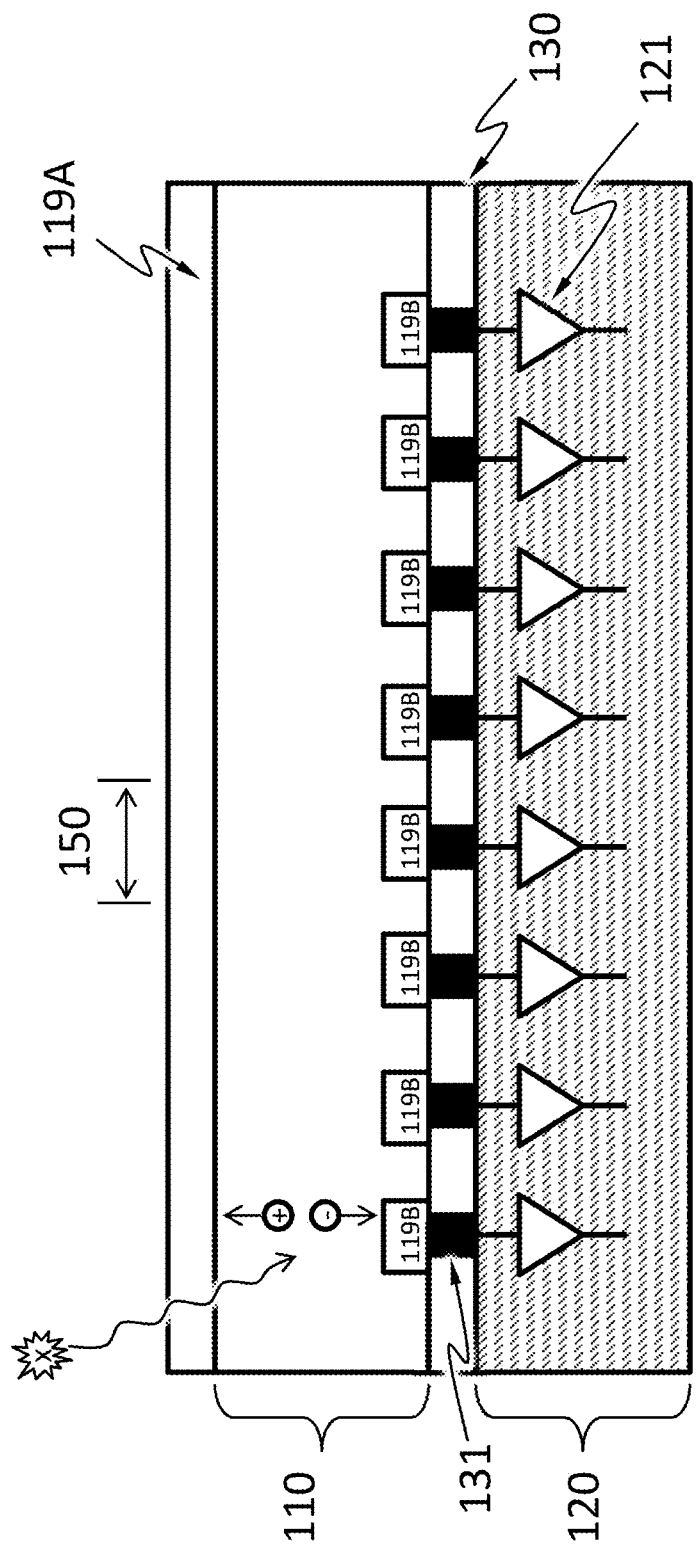
FIG. 1C schematically shows an alternative detailed cross-sectional view of the detector, according to an embodiment.

As shown in an alternative detailed cross-sectional view of the radiation detector 100 in FIG. 1C, according to an embodiment, the radiation absorption layer 110 may include a resistor of a semiconductor material such as, silicon, germanium, GaAs, CdTe, CdZnTe, or a combination thereof, but does not include a diode. The semiconductor may have a high mass attenuation coefficient for the radiation energy of interest.

When a particle of radiation hits the radiation absorption layer 110 including a resistor but not diodes, it may be absorbed and generate one or more charge carriers by a number of mechanisms. A particle of radiation may generate 10 to 100000 charge carriers. The charge carriers may drift to the electric contacts 119A and 119B under an electric field. The field may be an external electric field. The electric contact 119B includes discrete portions. In an embodiment, the charge carriers may drift in directions such that the charge carriers generated by a single particle of radiation are not substantially shared by two different discrete portions of the electric contact 119B ("not substantially shared" here means less than 2%, less than 0.5%, less than 0.1%, or less than 0.01% of these charge carriers flow to a different one of the discrete portions than the rest of the charge carriers). Charge carriers generated by a particle of radiation incident around the footprint of one of these discrete portions of the electric contact 119B are not substantially shared with another of these discrete portions of the electric contact 119B. A pixel 150 associated with a discrete portion of the electric contact 119B may be an area around the discrete portion in which substantially all (more than 98%, more than 99.5%, more than 99.9% or more than 99.99% of) charge carriers generated by a particle of radiation incident at an angle of incidence of 0° therein flow to the discrete portion of the electric contact 119B. Namely, less than 2%, less than 0.5%, less than 0.1%, or less than 0.01% of these charge carriers flow beyond the pixel associated with the one discrete portion of the electric contact 119B.

The electronics layer 120 may include an electronic system 121 suitable for processing or interpreting signals generated by particles of radiation incident on the radiation absorption layer 110. The electronic system 121 may include an analog circuitry such as a filter network, amplifiers, integrators, and comparators, or a digital circuitry such as a microprocessor, and memory. The electronic system 121 may include components shared by the pixels or components dedicated to a single pixel. For example, the electronic system 121 may include an amplifier dedicated to each pixel and a microprocessor shared among all the pixels. The electronic system 121 may be electrically connected to the pixels by vias 131. Space among the vias may be filled with a filler material 130, which may increase the mechanical stability of the connection of the electronics layer 120 to the radiation absorption layer 110. Other bonding techniques are possible to connect the electronic system 121 to the pixels without using vias.

Figure 2:
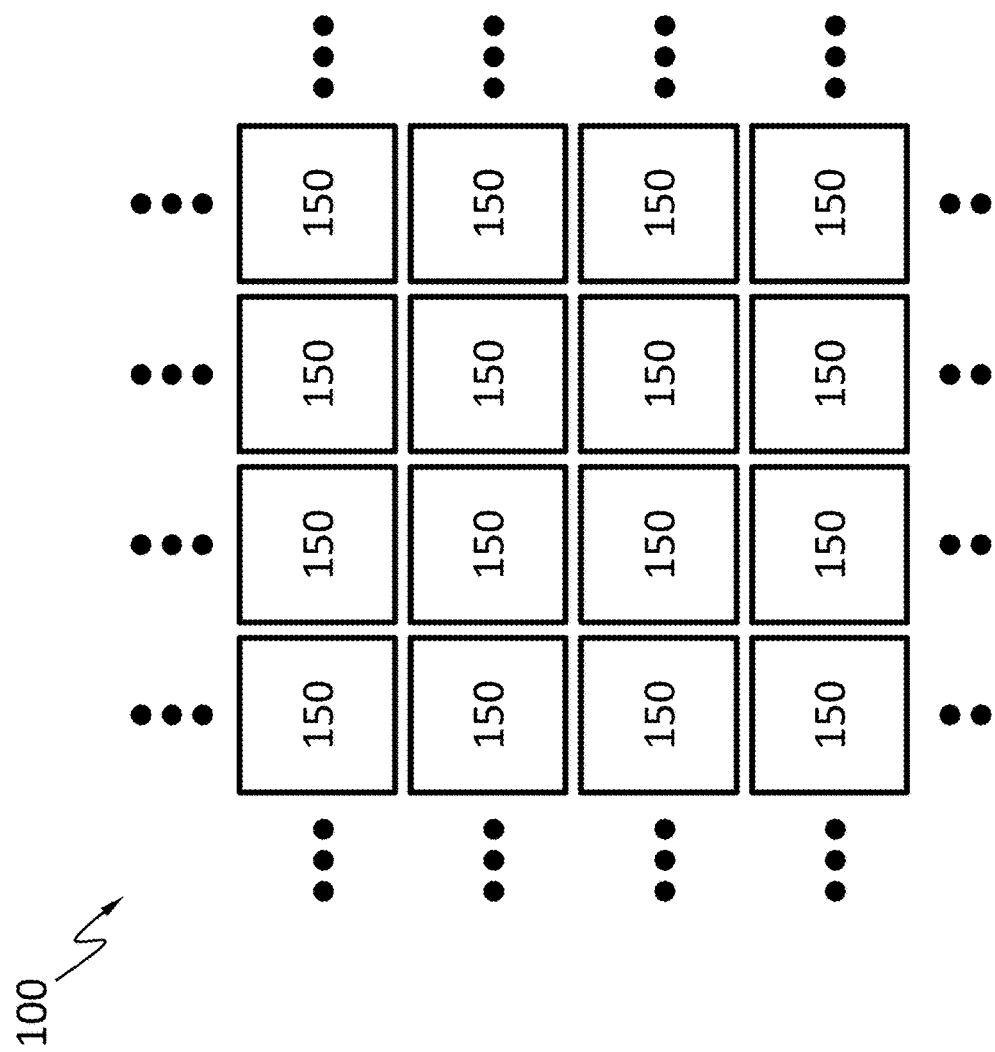
FIG. 2 schematically shows that the detector may have an array of pixels, according to an embodiment.

FIG. 2 schematically shows that the radiation detector 100 may have an array of pixels 150. Each of the pixels 150 may encompasses a portion of the radiation absorption layer 110. The array may be a rectangular array, a honeycomb array, a hexagonal array or any other suitable array. Each pixel 150 in the array may be configured to detect a particle of radiation incident thereon, measure the energy of the particle of radiation, or both. For example, each pixel 150 may be configured to count numbers of particles of radiation incident thereon whose energy falls in a plurality of bins, within a period of time. All the pixels 150 may be configured to count the numbers of particles of radiation incident thereon within a plurality of bins of energy within the same period of time. Each pixel 150 may have its own analog-to-digital converter (ADC) configured to digitize an analog signal representing the energy of an incident particle of radiation into a digital signal. The ADC may have a resolution of 10 bits or higher. Each pixel 150 may be configured to measure its dark current, such as before or concurrently with each particle of radiation incident thereon. Each pixel 150 may be configured to deduct the contribution of the dark current from the energy of the particle of radiation incident thereon. The pixels 150 may be configured to operate in parallel. For example, when one pixel 150 measures an incident particle of radiation, another pixel 150 may be waiting for another particle of radiation to arrive. The pixels 150 may be but do not have to be individually addressable.

Figure 3:
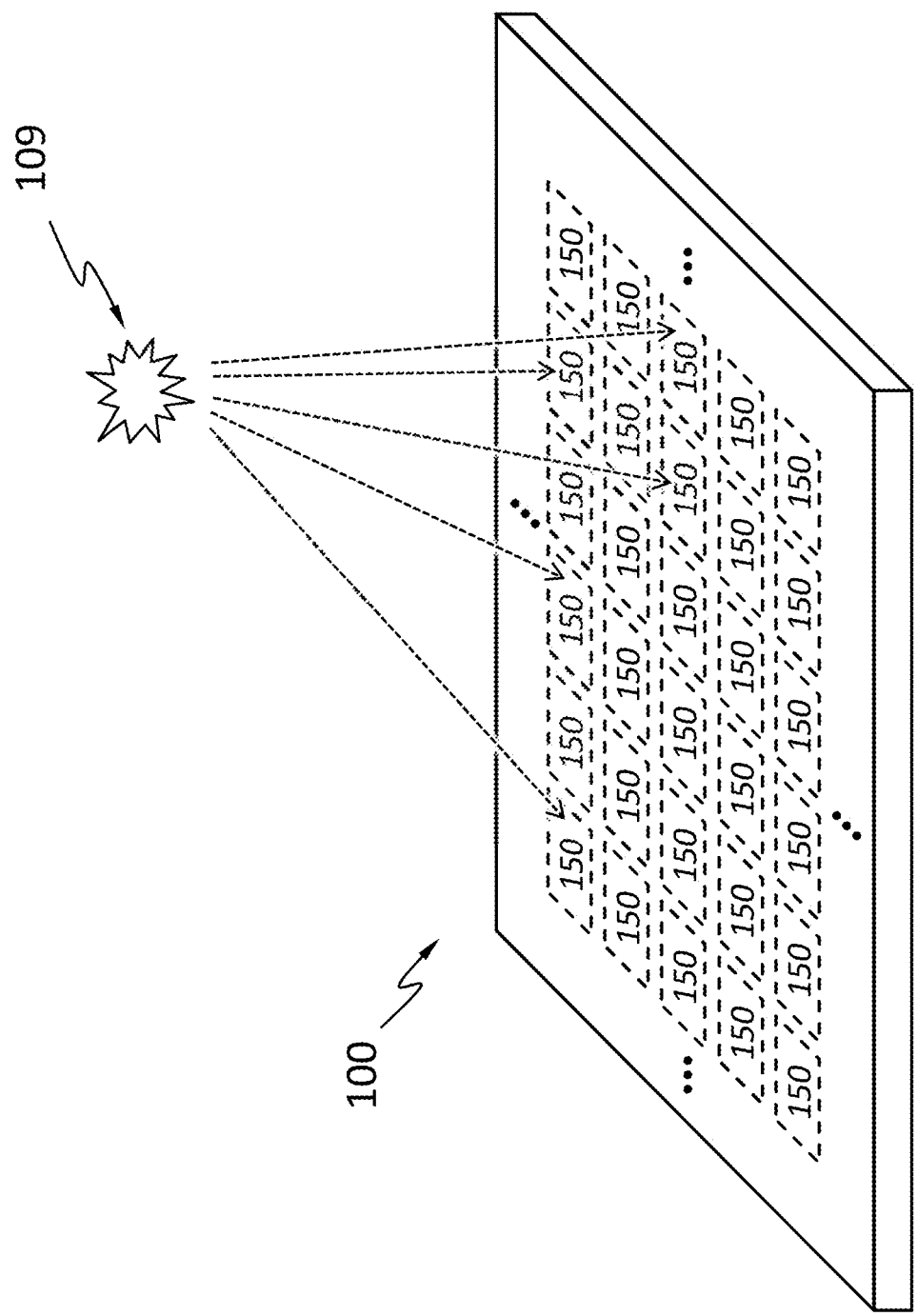
FIG. 3 schematically shows that the pixels in the array may receive particles of radiation at different angles of incidence.
Figure 4B:
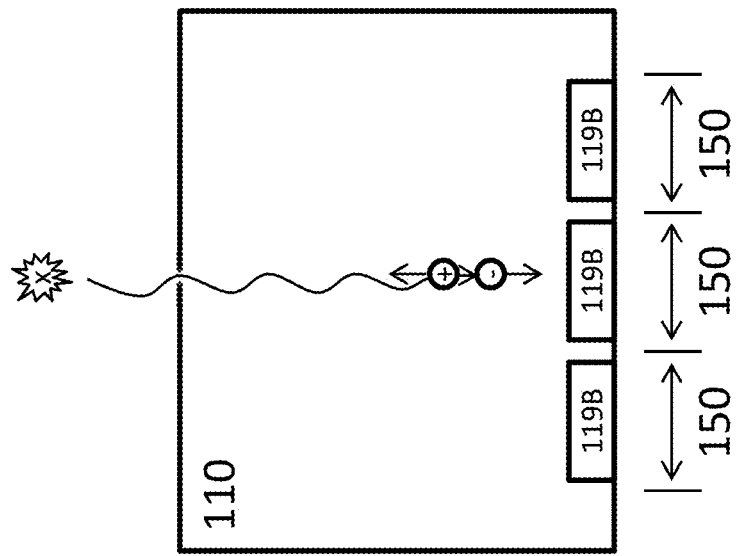
FIG. 4B schematically shows that charge carriers generated in a single pixel when a particle of radiation with an angle of incidence of 0° travels through the radiation absorption layer.
Figure 4A:
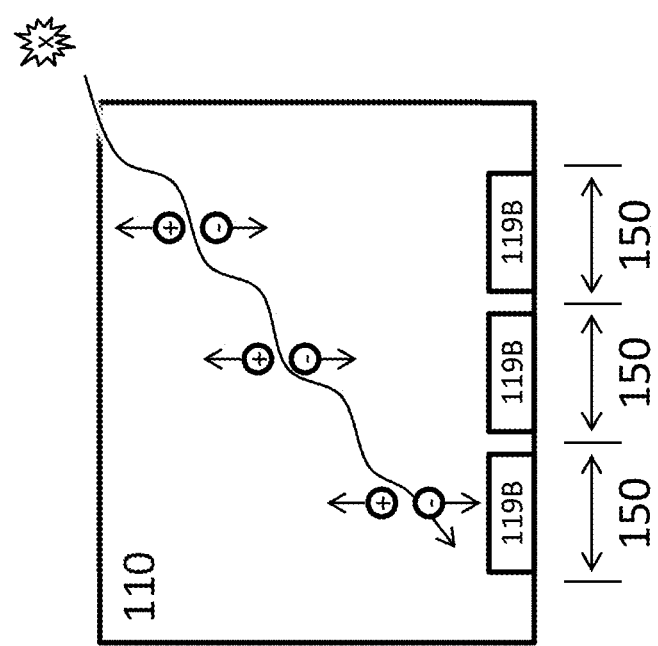
FIG. 4A schematically shows that charge carriers generated in multiple pixels when a particle of radiation with an oblique angle of incidence travels through the radiation absorption layer.

As shown in FIG. 3, pixels 150 in the array may receive particles of radiation from a radiation source 109 at different angles of incidence due to different positions of the pixels 150 with respect to the radiation source 109. The spatial resolution of the radiation detector 100 at different positions thereon may depend on the angle of incidence at those positions. The spatial resolution may be lower where the angle of incidence is oblique (e.g., >45°) than the spatial resolution where the angle of incidence is 0°. For example, the spatial resolution at the edges of the radiation detector 100 may be lower than the spatial resolution at the center of the radiation detector 100 when the angle of incidence at the center is 0° and the angles of incidence at the edges are oblique. If the field of view of the radiation detector 100 is large (e.g., 0.5π or larger) or the thickness of the radiation absorption layer 110 is comparable to or larger than the size of the pixels 150, the decrease of the spatial resolution from the center to the edges can be significant. The field of view of the radiation detector 100 is a solid angle through which the radiation detector 100 is sensitive to the radiation. FIG. 4A schematically shows that charge carriers may be generated in the pixels associated with multiple discrete portions of the electric contact 119B when a particle of radiation with an oblique angle of incidence travels through the radiation absorption layer 110. FIG. 4B schematically shows that charge carriers may be generated in the pixel associated with a single discrete portion of the electric contact 119B when a particle of radiation with an angle of incidence of 0° travels through the radiation absorption layer 110.

Figure 5A:
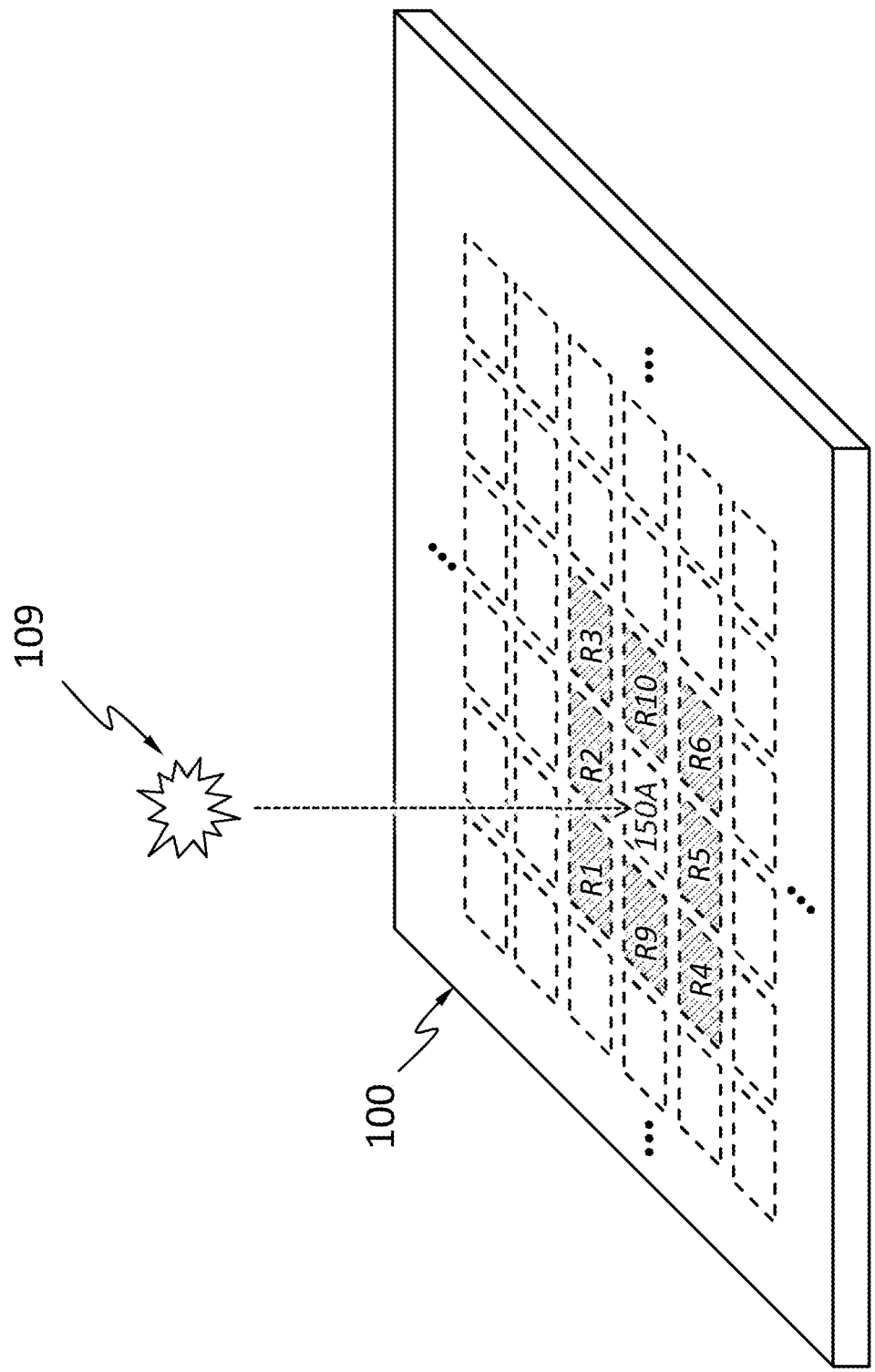
FIG. 5A-5C each schematically show corrections of a signal from a pixel using signals from reference pixels, according to some embodiments.

The signal generated at a pixel in the array from the incident radiation (e.g., due to the effects shown in FIG. 4A) may be corrected with a combination of a set of reference signals generated from the radiation at a set of reference pixels in the array. A set of weights may be respectively applied to the set of reference signals in the combination. The combination may be expressed using a formula C=f({e}, {p}), where C is the combination, {e} is the set of reference signals and {p} is the set of weights. The set of weights may be a function of a location of the pixel with respect to the array. In the example shown in FIG. 5A, to correct the signal from the pixel 150A, the set of reference pixels for the pixel 150A may include neighboring pixels (e.g., R1, R2, R3, R4, R5, R6, R9 and R10 in FIG. 5A), or pixels at particular locations within the array. The pixel 150A itself may be a member of the set of reference pixels. The set of reference signals may respectively be generated at the set of reference pixels during the same time period as the signal generated at the pixel 150A. The set of weights associated with the pixel 150A is respectively applied to the set of reference signals to correct the signal of the pixel 150A. The set of weights may be a function of relative locations of the reference pixels with respect to the array. The combination of the set of reference signals may be a sum of the set of reference signals with the set of weights applied thereto. For example, the corrected signal of the pixel 150A may be $E_{150A}=e_{150A}+[(e_{150A} \times p_{150A})+(e_{R9} \times p_{R9})+(e_{R10} \times p_{R10})+(e_{R1} \times p_{R1})+(e_{R2} \times p_{R2})+(e_{R3} \times p_{R3})+(e_{R4} \times p_{R4})+(e_{R5} \times p_{R5})+(e_{R6} \times p_{R6})]$, where $e_{150A}$ is the signal of the pixel 150A, the set of reference signals include the signal $e_{150A}$, of the pixel 150A, the signal $e_{R9}$ of the pixel R9, the signal $e_{R10}$ of the pixel R10, the signal $e_{R1}$ of the pixel R1, the signal $e_{R2}$ of the pixel R2, the signal $e_{R3}$ of the pixel R3, the signal $e_{R4}$ of the pixel R4, the signal $e_{R5}$ of the pixel R5, and the signal $e_{R6}$ of the pixel R6, and $p_{150A}$ is the weight applied to $e_{150A}$, $p_{R9}$ is the weight applied to $e_{R9}$, $p_{R10}$ is the weight applied to $e_{R10}$, $p_{R1}$ is the weight applied to $e_{R1}$, $p_{R2}$ is the weight applied to $e_{R2}$, $p_{R3}$ is the weight applied to $e_{R3}$, $p_{R4}$ is the weight applied to $e_{R4}$, $p_{R5}$ is the weight applied to $e_{R5}$, $p_{R6}$ is the weight applied to $e_{R6}$.

Figure 5B:
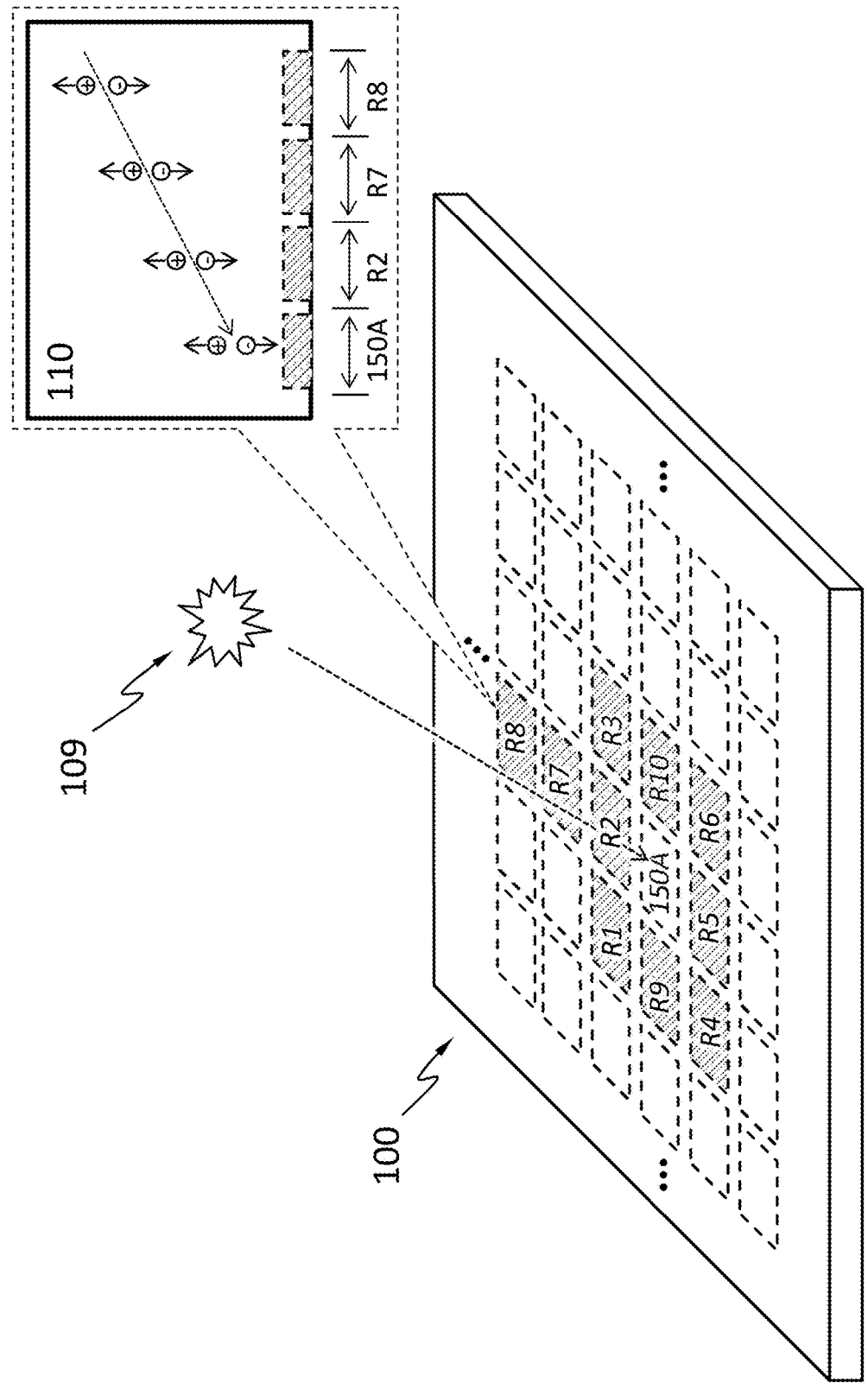

According to an embodiment, the set of weights is a function of a direction of propagation of the radiation at the pixel, which is inside the direction of propagation of the radiation inside the radiation absorption layer 110 at the pixel. The direction of propagation of the radiation may be related to the angle of incidence. In the example shown in FIG. 5B, the angle of incidence of the particle of radiation received by the pixel 150A is oblique (e.g., >45°) and the direction of propagation is also not perpendicular to the surface of the radiation detector 100. The particle of radiation may generate charges carries in other pixels (e.g., R2, R7, R8) before it reaches the pixel 150A. In this scenario, the set of reference pixels may include the pixels (e.g., R2, R7, R8) along the traveling path of the particle of radiation. The set of reference pixels may also include other neighboring pixels (e.g., R1, R3, R4, R5, R6, R9, R10). The set of the reference pixels may also include the pixel 150A itself. For example, the corrected signal of the pixel 150A may be $E_{150A}=e_{150A}+[(e_{150A} \times p_{150A})+(e_{R9} \times p_{R9})+(e_{R10} \times p_{R10})+(e_{R1} \times p_{R1})+(e_{R2} \times p_{R2})+(e_{R3} \times p_{R3})+(e_{R4} \times p_{R4})+(e_{R5} \times p_{R5})+(e_{R6} \times p_{R6})+(e_{R7} \times p_{R7})+(e_{R8} \times p_{R8})]$, where $p_{R7}$ is the weight applied to $e_{R7}$, $p_{R8}$ is the weight applied to $e_{R8}$.

According to an embodiment, the set of weights is a function of relative positions of the set of reference pixels with respect to the pixel. In the example shown in FIG. 5B, the particle of radiation generates more charge carriers in reference pixels R7 and R8 than in reference pixel R5 because by the time the particle reaches the pixel 150A, it has been almost entirely absorbed and thus any signal it generates in reference pixel R5 is expected to be much weaker than the signals it generates in reference pixels R7 and R8. The weights for reference pixel R7 and R8 thus might be larger than the weight for reference pixel R5.

Figure 5C:
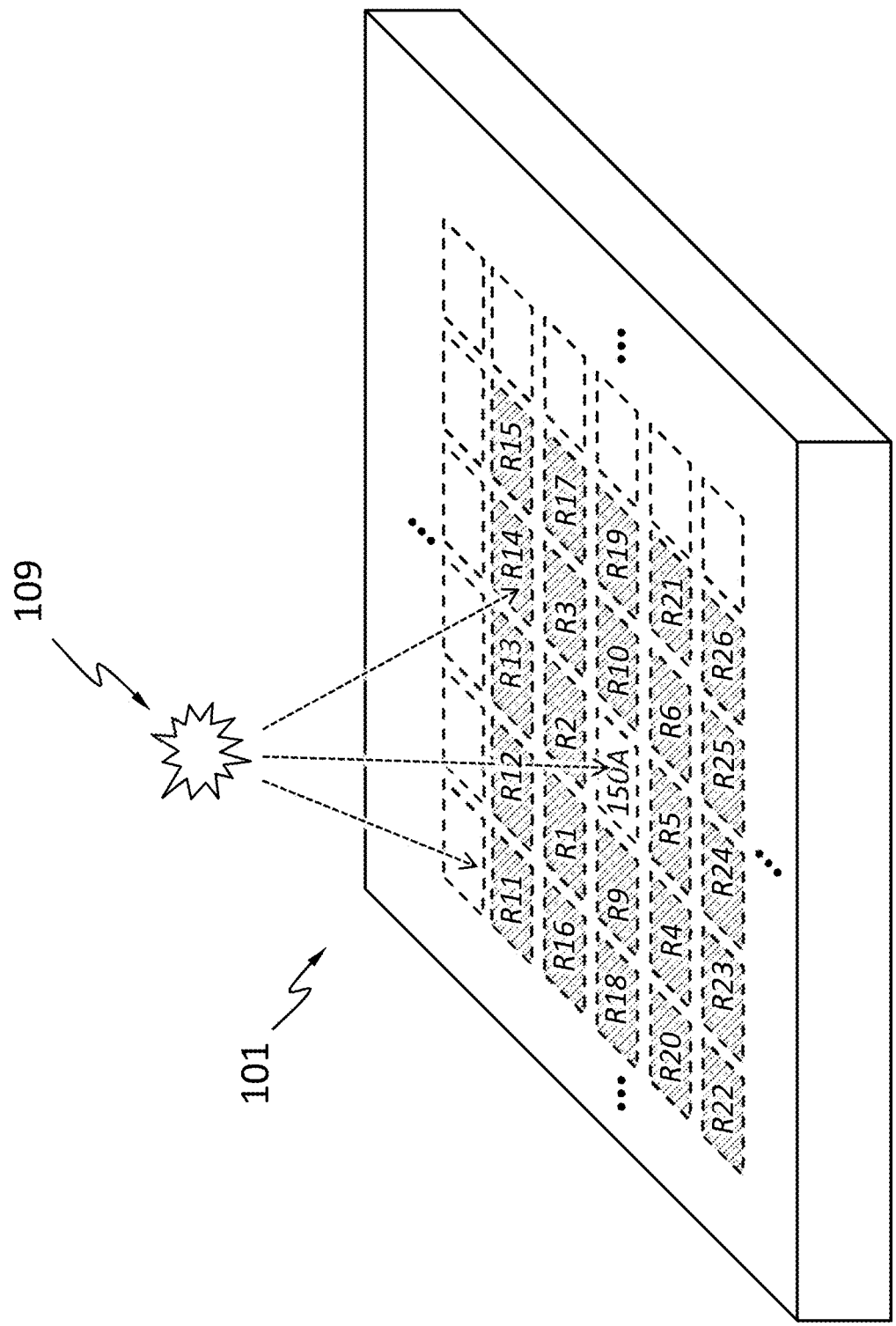

According to one embodiment, the set of weights is a function of a thickness of the radiation absorption layer of the radiation detector 100. In FIG. 5C, a radiation detector 101 with a thicker radiation absorption layer than the radiation detector 100 is shown. At the direction of propagation, a particle of radiation may pass through more pixels in the thicker radiation absorption layer. Therefore, the set of reference pixels may include more than the immediately neighboring pixels. For example, the set of reference pixels may include reference pixels R1-R6, R9, R10, and R11-R26. The set of weights thus would include weights for reference pixels R11-R26.

Figure 6:
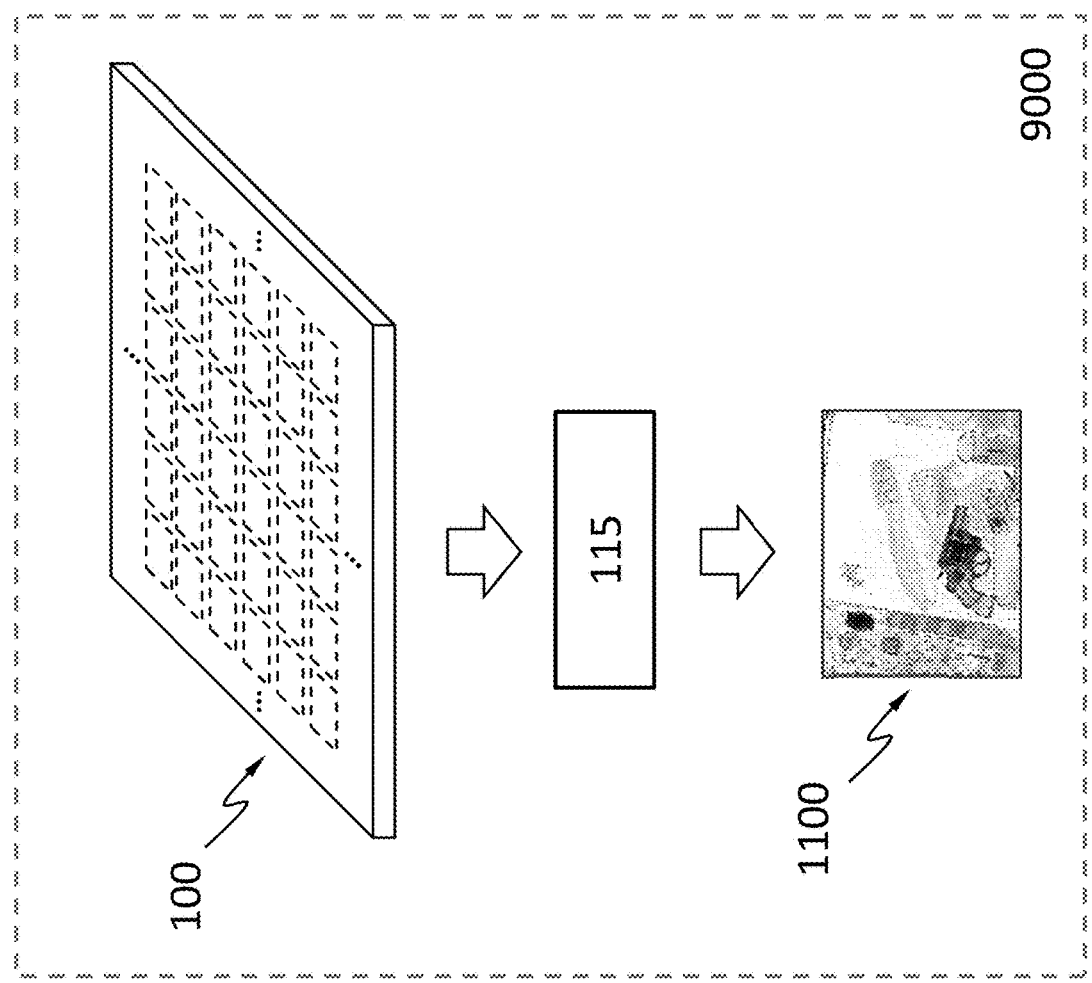
FIG. 6 schematically shows a functional diagram of a system comprising the radiation detector and a processor, according to an embodiment.

FIG. 6 schematically shows a system 9000, according to an embodiment. The system has the radiation detector 100 and a processor 115 configured to execute the corrections on the signals from one or more pixels in the radiation detector 100. The processor 115 may be configured to form an image 1100 based on the corrected signals.

Figure 7:
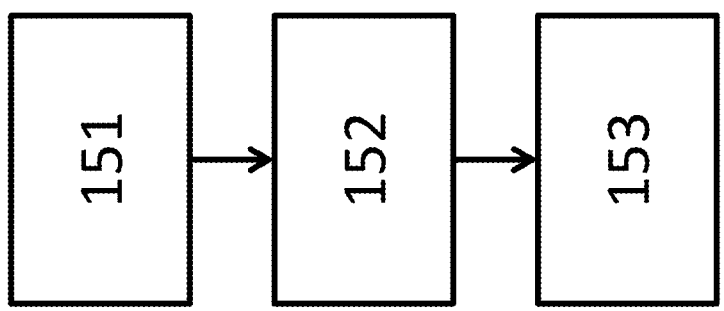
FIG. 7 schematically shows a flowchart for a method, according to an embodiment.

FIG. 7 schematically shows a flowchart for a method, according to an embodiment. In procedure 151, a signal at a pixel in an array of pixels of a radiation detector is obtained (e.g., signal $e_{150A}$ of the pixel 150A of the radiation detector 100). The signal is generated from radiation incident on the radiation detector 100. In procedure 152, a corrected signal is obtained by correcting the signal with a combination of a set of reference signals generated from the radiation at a set of reference pixels in the array. A set of weights are respectively applied to the set of reference signals in the combination. The set of weights is a function of a location of the pixel (e.g., a position of the pixel 150A) with respect to the array. In procedure 153, an image is formed based on the corrected signal (e.g., the corrected signal $E_{150A}$). The method may be implemented by executing instructions using a computer, where the instructions are recorded on a computer program product comprising a non-transitory computer readable medium.

The radiation detector 100 described above may be used in various systems such as those provided below.

Figure 8:
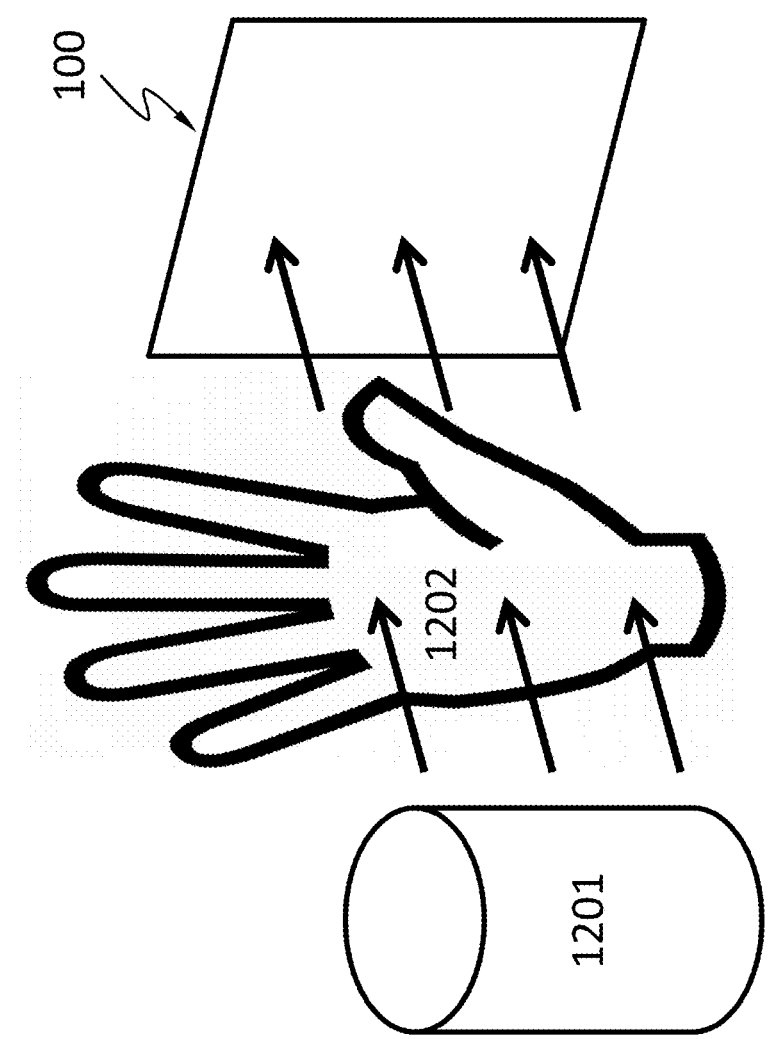
FIG. 8 schematically shows a system comprising the method described herein, suitable for medical imaging such as chest radiation radiography, abdominal radiation radiography, etc., according to an embodiment.

FIG. 8 schematically shows a system comprising the radiation detector 100 described herein. The system may be used for medical imaging such as chest radiation radiography, abdominal radiation radiography, etc. The system comprises a radiation source 1201. Radiation emitted from the radiation source 1201 penetrates an object 1202 (e.g., a human body part such as chest, limb, abdomen), is attenuated by different degrees by the internal structures of the object 1202 (e.g., bones, muscle, fat and organs, etc.), and is projected to radiation detector 100. The radiation detector 100 forms an image by detecting the intensity distribution of the radiation.

Figure 9:
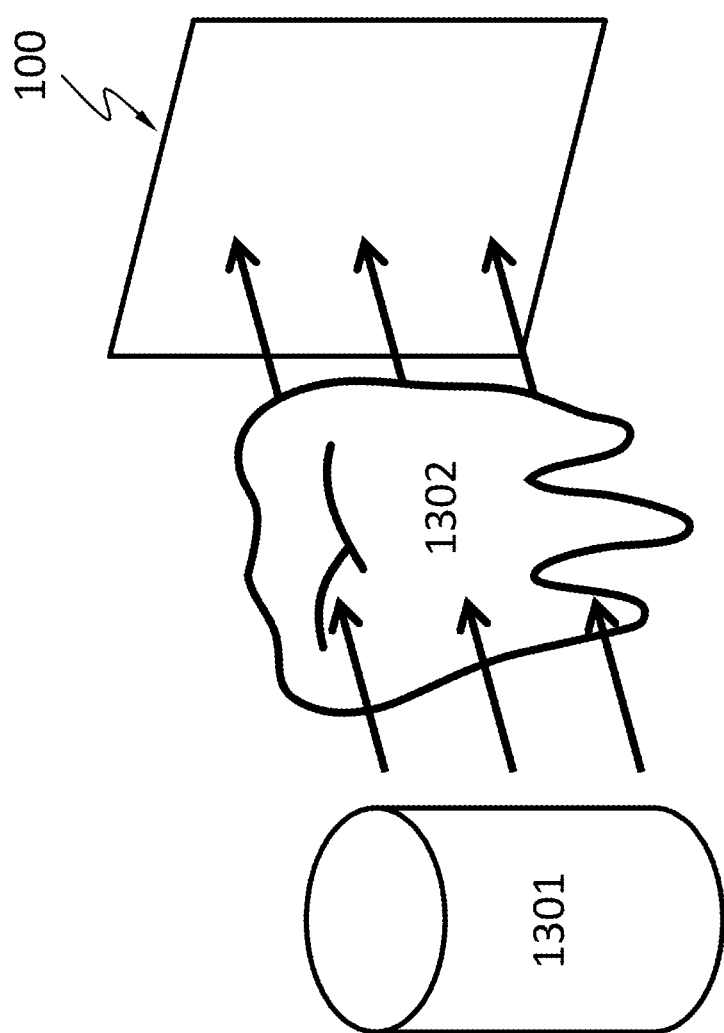
FIG. 9 schematically shows a system comprising the method described herein suitable for dental radiation radiography, according to an embodiment.

FIG. 9 schematically shows a system comprising the radiation detector 100 described herein. The system may be used for medical imaging such as dental radiation radiography. The system comprises a radiation source 1301. Radiation emitted from the radiation source 1301 penetrates an object 1302 that is part of a mammal (e.g., human) mouth. The object 1302 may include a maxilla bone, a palate bone, a tooth, the mandible, or the tongue. The radiation is attenuated by different degrees by the different structures of the object 1302 and is projected to the radiation detector 100. The radiation detector 100 forms an image by detecting the intensity distribution of the radiation. Teeth absorb radiation more than dental caries, infections, periodontal ligament. The dosage of radiation received by a dental patient is typically small (around 0.150 mSv for a full mouth series).

Figure 10:
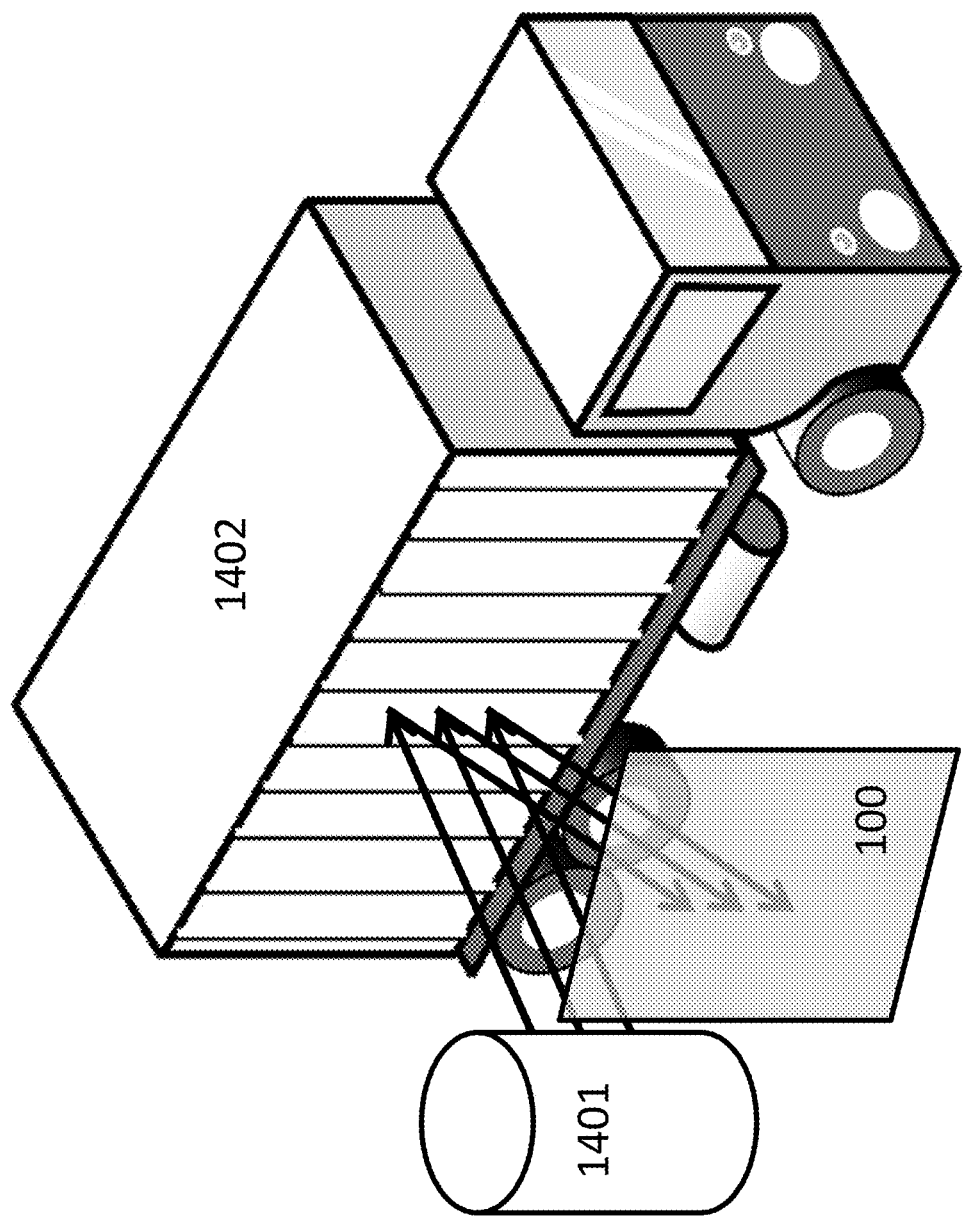
FIG. 10 schematically shows a cargo scanning or non-intrusive inspection (NII) system comprising the method described herein, according to an embodiment.

FIG. 10 schematically shows a cargo scanning or non-intrusive inspection (NII) system comprising the radiation detector 100 described herein. The system may be used for inspecting and identifying goods in transportation systems such as shipping containers, vehicles, ships, luggage, etc. The system comprises a radiation source 1401. Radiation emitted from the radiation source 1401 may backscatter from an object 1402 (e.g., shipping containers, vehicles, ships, etc.) and be projected to the radiation detector 100. Different internal structures of the object 1402 may backscatter radiation differently. The radiation detector 100 forms an image by detecting the intensity distribution of the backscattered radiation and/or energies of the backscattered particles of radiation.

Figure 11:
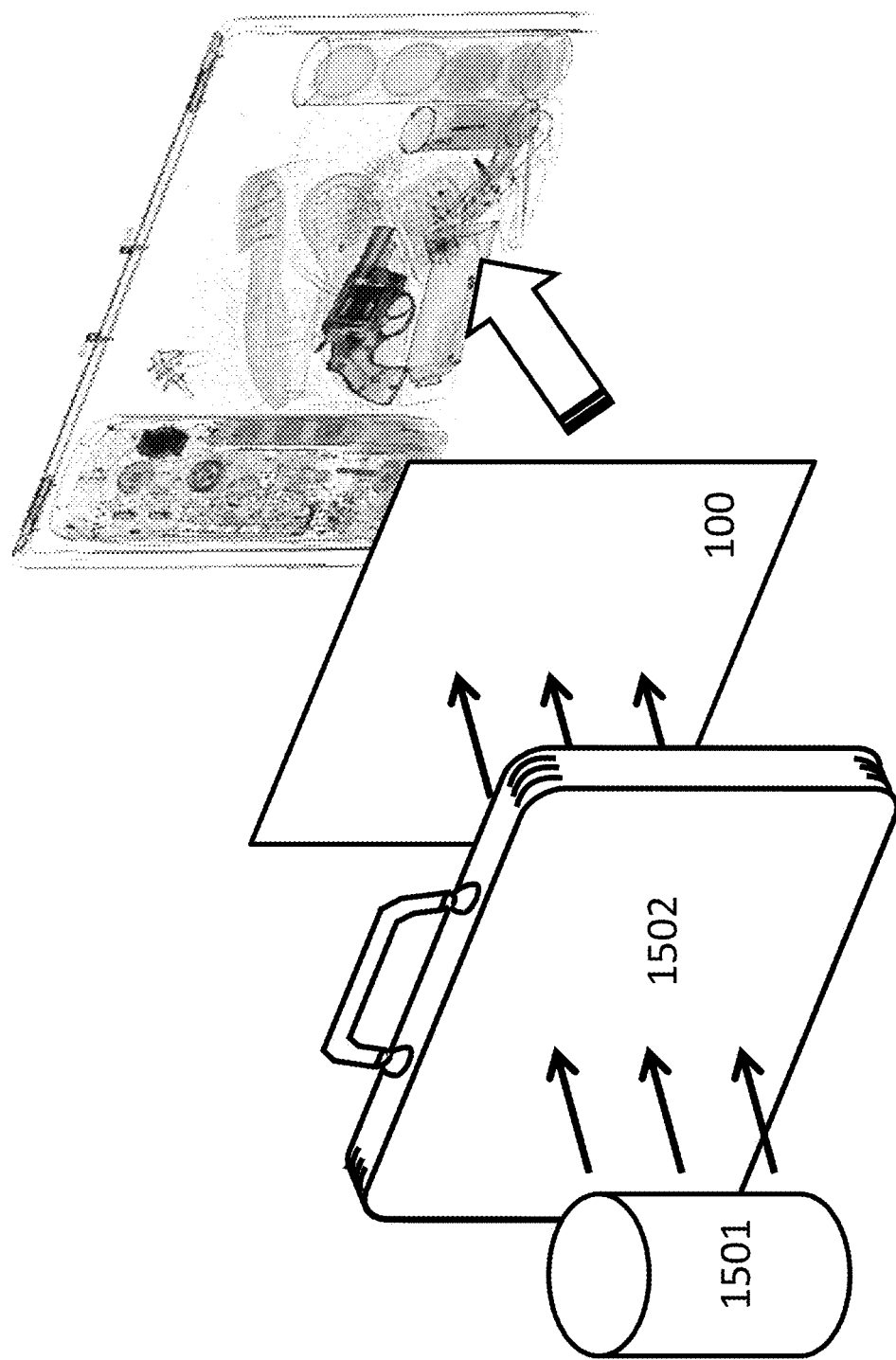
FIG. 11 schematically shows another cargo scanning or non-intrusive inspection (NII) system comprising the method described herein, according to an embodiment.

FIG. 11 schematically shows another cargo scanning or non-intrusive inspection (NII) system comprising the radiation detector 100 described herein. The system may be used for luggage screening at public transportation stations and airports. The system comprises a radiation source 1501. Radiation emitted from the radiation source 1501 may penetrate a piece of luggage 1502, be differently attenuated by the contents of the luggage, and projected to the radiation detector 100. The radiation detector 100 forms an image by detecting the intensity distribution of the transmitted radiation. The system may reveal contents of luggage and identify items forbidden on public transportation, such as firearms, narcotics, edged weapons, flammables.

Figure 12:
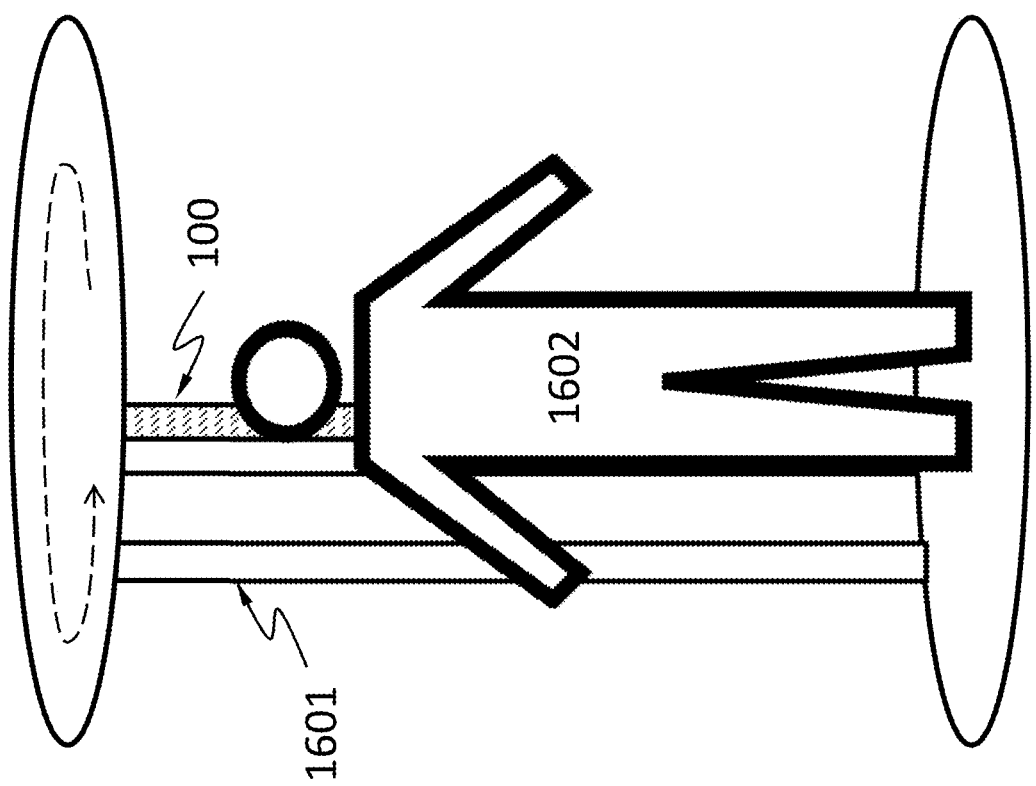
FIG. 12 schematically shows a full-body scanner system comprising the method described herein, according to an embodiment.

FIG. 12 schematically shows a full-body scanner system comprising the radiation detector 100 described herein. The full-body scanner system may detect objects on a person's body for security screening purposes, without physically removing clothes or making physical contact. The full-body scanner system may be able to detect non-metal objects. The full-body scanner system comprises a radiation source 1601. Radiation emitted from the radiation source 1601 may backscatter from a human 1602 being screened and objects thereon, and be projected to the radiation detector 100. The objects and the human body may backscatter radiation differently. The radiation detector 100 forms an image by detecting the intensity distribution of the backscattered radiation. The radiation detector 100 and the radiation source 1601 may be configured to scan the human in a linear or rotational direction.

Figure 13:
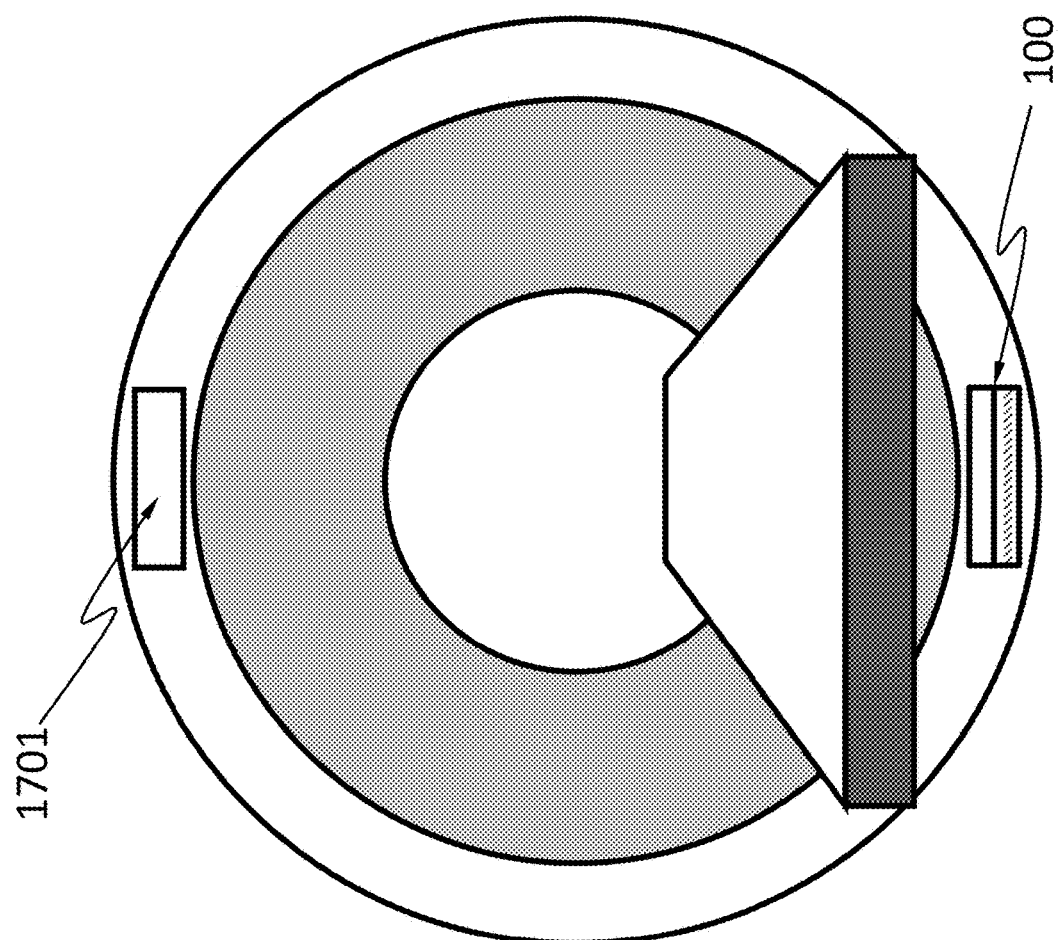
FIG. 13 schematically shows a radiation computed tomography (Radiation CT) system comprising the method described herein, according to an embodiment.

FIG. 13 schematically shows a radiation computed tomography (Radiation CT) system. The radiation CT system uses computer-processed radiations to produce tomographic images (virtual "slices") of specific areas of a scanned object. The tomographic images may be used for diagnostic and therapeutic purposes in various medical disciplines, or for flaw detection, failure analysis, metrology, assembly analysis and reverse engineering. The radiation CT system comprises the radiation detector 100 described herein and a radiation source 1701. The radiation detector 100 and the radiation source 1701 may be configured to rotate synchronously along one or more circular or spiral paths.

The radiation detector 100 described here may have other applications such as in a radiation telescope, radiation mammography, industrial radiation defect detection, radiation microscopy or microradiography, radiation casting inspection, radiation non-destructive testing, radiation weld inspection, radiation digital subtraction angiography, etc.

The electronics layer 120 in the radiation detector 100 may include an electronic system 121 suitable for processing or interpreting or correcting signals generated by particles of radiation incident on the pixels 150 comprising radiation absorption layer 110. The electronic system 121 may include an analog circuitry such as a filter network, amplifiers, integrators, and comparators, or a digital circuitry such as a microprocessor, and a memory. The electronic system 121 may include components shared by the pixels or components dedicated to a single pixel. For example, the electronic system 121 may include an amplifier dedicated to each pixel and a microprocessor shared among all the pixels. The electronic system 121 may be electrically connected to the pixels by vias 131. Space among the vias may be filled with a filler material 130, which may increase the mechanical stability of the connection of the electronics layer 120 to the radiation absorption layer 110. Other bonding techniques are possible to connect the electronic system 121 to the pixels without using vias.

Figure 14A:
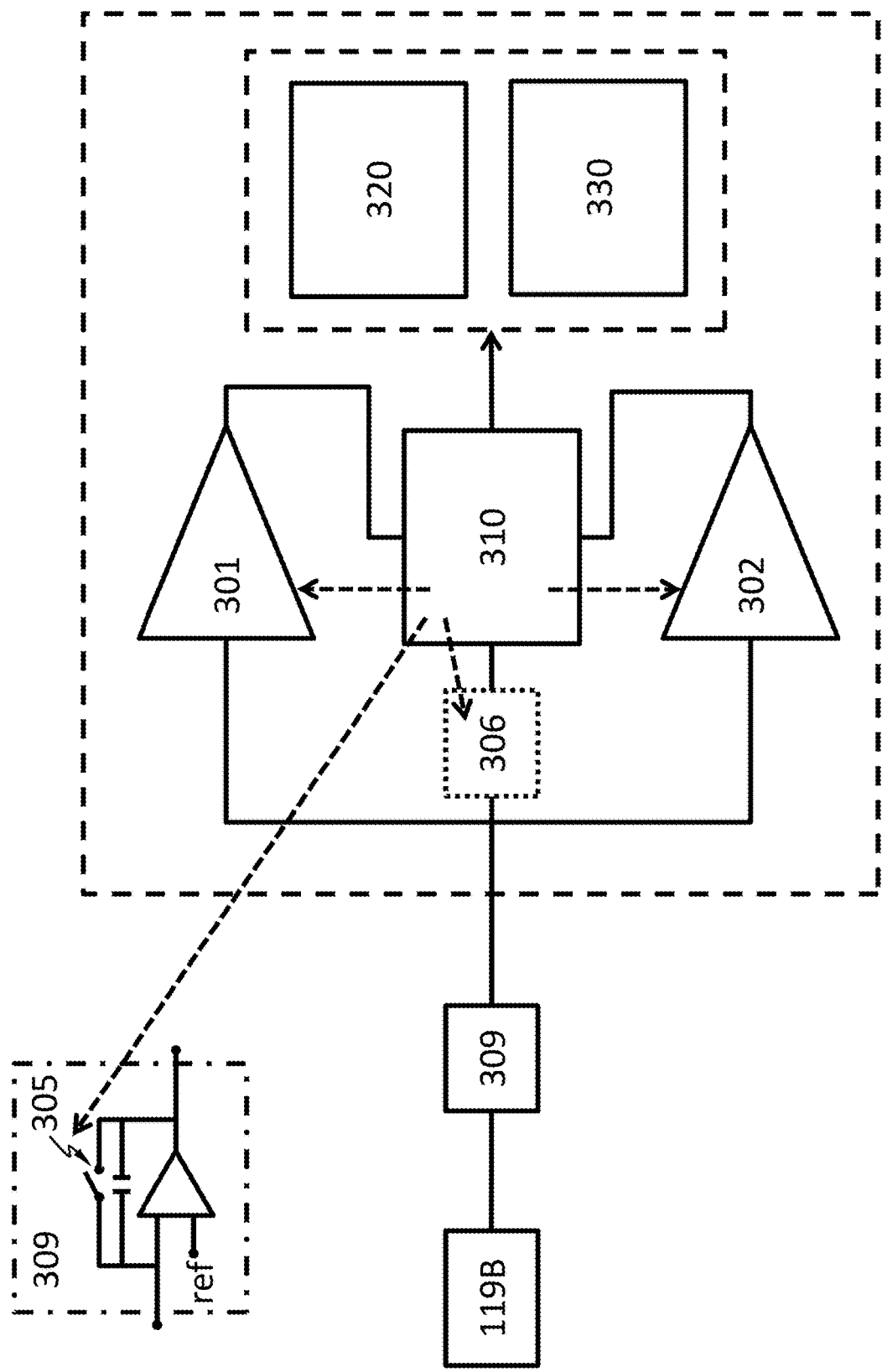
FIG. 14A and FIG. 14B each show a component diagram of an electronic system of the radiation detector in FIG. 1A, FIG. 1B and FIG. 1C, according to an embodiment.
Figure 14B:
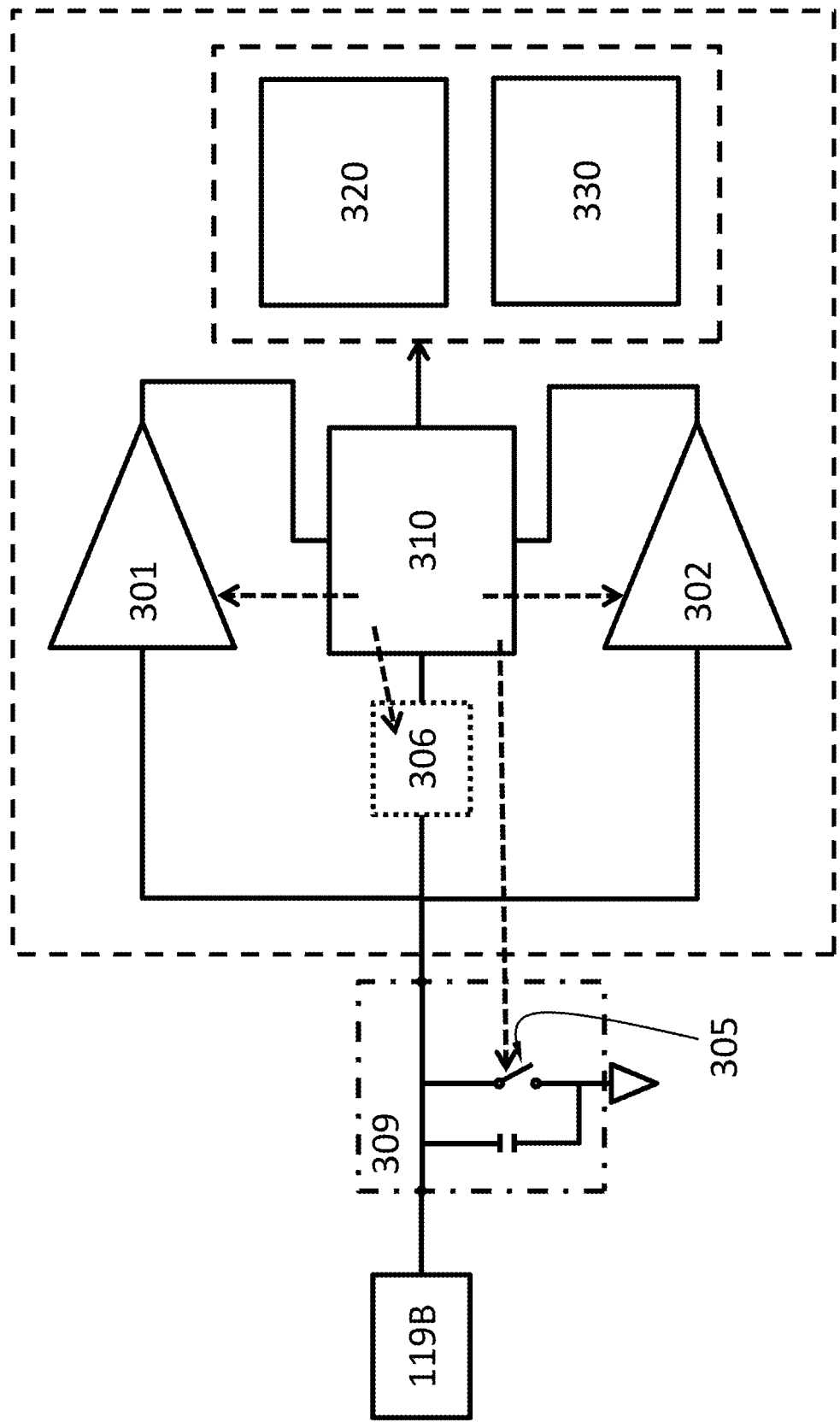

FIG. 14A and FIG. 14B each show a component diagram of the electronic system 121, according to an embodiment. The electronic system 121 may include a first voltage comparator 301, a second voltage comparator 302, a counter 320, a switch 305, an optional voltmeter 306, a controller 310 and a memory 330.

The first voltage comparator 301 is configured to compare the voltage of at least one of the electric contacts 119B to a first threshold. The first voltage comparator 301 may be configured to monitor the voltage directly, or calculate the voltage by integrating an electric current flowing through the electrical contact 119B over a period of time. The first voltage comparator 301 may be controllably activated or deactivated by the controller 310. The first voltage comparator 301 may be a continuous comparator. Namely, the first voltage comparator 301 may be configured to be activated continuously and monitor the voltage continuously. The first voltage comparator 301 may be a clocked comparator. The first threshold may be 5-10%, 10%-20%, 20-30%, 30-40% or 40-50% of the maximum voltage one incident particle of radiation may generate on the electric contact 119B. The maximum voltage may depend on the energy of the incident particle of radiation, the material of the radiation absorption layer 110, and other factors. For example, the first threshold may be 50 mV, 100 mV, 150 mV, or 200 mV.

The second voltage comparator 302 is configured to compare the voltage to a second threshold. The second voltage comparator 302 may be configured to monitor the voltage directly or calculate the voltage by integrating an electric current flowing through the diode or the electrical contact over a period of time. The second voltage comparator 302 may be a continuous comparator. The second voltage comparator 302 may be controllably activate or deactivated by the controller 310. When the second voltage comparator 302 is deactivated, the power consumption of the second voltage comparator 302 may be less than 1%, less than 5%, less than 10% or less than 20% of the power consumption when the second voltage comparator 302 is activated. The absolute value of the second threshold is greater than the absolute value of the first threshold. As used herein, the term "absolute value" or "modulus" |x| of a real number x is the non-negative value of x without regard to its sign. Namely, $$|x| = \begin{cases} x, \text{if } x \geq 0 \\ -x, \text{if } x \leq 0 \end{cases}.$$

The second threshold may be 200%-300% of the first threshold. The second threshold may be at least 50% of the maximum voltage one incident particle of radiation may generate on the electric contact 119B. For example, the second threshold may be 100 mV, 150 mV, 200 mV, 250 mV or 300 mV. The second voltage comparator 302 and the first voltage comparator 310 may be the same component. Namely, the system 121 may have one voltage comparator that can compare a voltage with two different thresholds at different times.

The first voltage comparator 301 or the second voltage comparator 302 may include one or more op-amps or any other suitable circuitry. The first voltage comparator 301 or the second voltage comparator 302 may have a high speed to allow the system 121 to operate under a high flux of incident particles of radiation. However, having a high speed is often at the cost of power consumption.

The counter 320 is configured to register at least a number of particles of radiation incident on the pixel 150 encompassing the electric contact 119B. The counter 320 may be a software component (e.g., a number stored in a computer memory) or a hardware component (e.g., a 4017 IC and a 7490 IC).

The memory 330 is configured to store the sets of weights associated with pixels 150, generated signals and corrected signals of pixels 150. The memory 330 may also be used to store temporary values or results during corrections of signals, and to store programs, procedures, or functions of signal correction. The memory may be made of a plurality of nonvolatile memory devices, such as flash memory.

The controller 310 may be a hardware component such as a microcontroller or a microprocessor. The controller 310 is configured to start a time delay from a time at which the first voltage comparator 301 determines that the absolute value of the voltage equals or exceeds the absolute value of the first threshold (e.g., the absolute value of the voltage increases from below the absolute value of the first threshold to a value equal to or above the absolute value of the first threshold). The absolute value is used here because the voltage may be negative or positive, depending on whether the voltage of the cathode or the anode of the diode or which electrical contact is used. The controller 310 may be configured to keep deactivated the second voltage comparator 302, the counter 320 and any other circuits the operation of the first voltage comparator 301 does not require, before the time at which the first voltage comparator 301 determines that the absolute value of the voltage equals or exceeds the absolute value of the first threshold. The time delay may expire before or after the voltage becomes stable, i.e., the rate of change of the voltage is substantially zero. The phase "the rate of change of the voltage is substantially zero" means that temporal change of the voltage is less than 0.1%/ns. The phase "the rate of change of the voltage is substantially non-zero" means that temporal change of the voltage is at least 0.1%/ns.

The controller 310 may be configured to activate the second voltage comparator during (including the beginning and the expiration) the time delay. In an embodiment, the controller 310 is configured to activate the second voltage comparator at the beginning of the time delay. The term "activate" means causing the component to enter an operational state (e.g., by sending a signal such as a voltage pulse or a logic level, by providing power, etc.). The term "deactivate" means causing the component to enter a non-operational state (e.g., by sending a signal such as a voltage pulse or a logic level, by cut off power, etc.). The operational state may have higher power consumption (e.g., 10 times higher, 100 times higher, 1000 times higher) than the non-operational state. The controller 310 itself may be deactivated until the output of the first voltage comparator 301 activates the controller 310 when the absolute value of the voltage equals or exceeds the absolute value of the first threshold.

The controller 310 may be configured to cause at least one of the number registered by the counter 320 to increase by one, if, during the time delay, the second voltage comparator 302 determines that the absolute value of the voltage equals or exceeds the absolute value of the second threshold.

The controller 310 may be configured to cause the optional voltmeter 306 to measure the voltage upon expiration of the time delay. The controller 310 may be configured to connect the electric contact 119B to an electrical ground, so as to reset the voltage and discharge any charge carriers accumulated on the electric contact 119B. In an embodiment, the electric contact 119B is connected to an electrical ground after the expiration of the time delay. In an embodiment, the electric contact 119B is connected to an electrical ground for a finite reset time period. The controller 310 may connect the electric contact 119B to the electrical ground by controlling the switch 305. The switch may be a transistor such as a field-effect transistor (FET).

The controller 310 may be configured to perform the signal correction by reading the sets of weights from the memory 330, executing programs or procedures stored in the memory 330.

In an embodiment, the system 121 has no analog filter network (e.g., a RC network). In an embodiment, the system 121 has no analog circuitry.

The voltmeter 306 may feed the voltage it measures to the controller 310 as an analog or digital signal.

The electronic system 121 may include an integrator 309 electrically connected to the electric contact 119B, wherein the integrator is configured to collect charge carriers from the electric contact 119B. The integrator 309 can include a capacitor in the feedback path of an amplifier. The amplifier configured as such is called a capacitive transimpedance amplifier (CTIA). CTIA has high dynamic range by keeping the amplifier from saturating and improves the signal-to-noise ratio by limiting the bandwidth in the signal path. Charge carriers from the electric contact 119B accumulate on the capacitor over a period of time ("integration period"). After the integration period has expired, the capacitor voltage is sampled and then reset by a reset switch. The integrator 309 can include a capacitor directly connected to the electric contact 119B.

Figure 15:
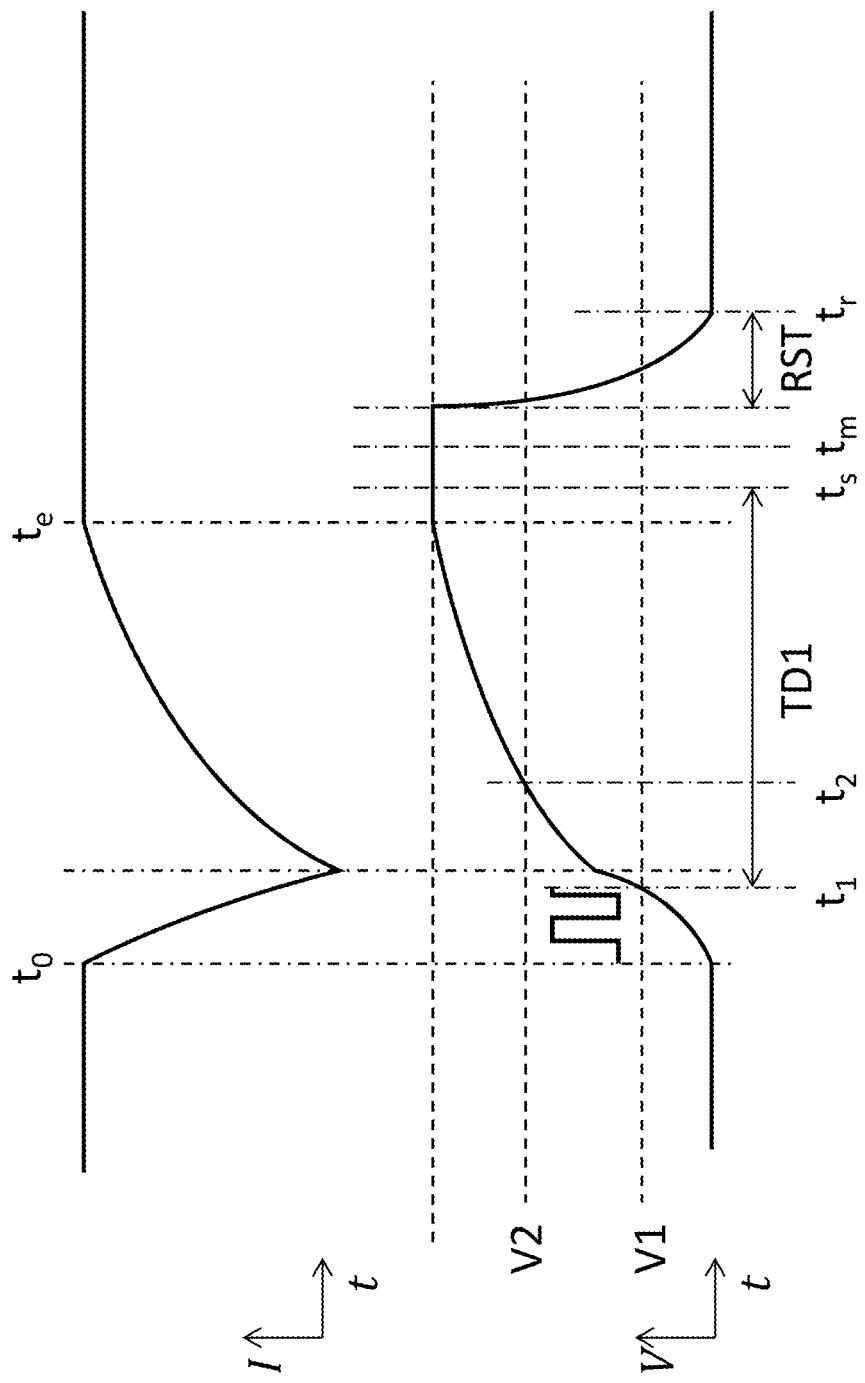
FIG. 15 schematically shows a temporal change of the electric current flowing through an electrode (upper curve) of a diode or an electric contact of a resistor of a radiation absorption layer exposed to radiation, the electric current caused by charge carriers generated by a particle of radiation incident on the radiation absorption layer, and a corresponding temporal change of the voltage of the electrode (lower curve), according to an embodiment.

FIG. 15 schematically shows a temporal change of the electric current flowing through the electric contact 119B (upper curve) caused by charge carriers generated by a particle of radiation incident on the pixel 150 encompassing the electric contact 119B, and a corresponding temporal change of the voltage of the electric contact 119B (lower curve). The voltage may be an integral of the electric current with respect to time. At time $t_0$, the particle of radiation hits pixel 150, charge carriers start being generated in the pixel 150, electric current starts to flow through the electric contact 119B, and the absolute value of the voltage of the electric contact 119B starts to increase. At time $t_1$, the first voltage comparator 301 determines that the absolute value of the voltage equals or exceeds the absolute value of the first threshold V1, and the controller 310 starts the time delay TD1 and the controller 310 may deactivate the first voltage comparator 301 at the beginning of TD1. If the controller 310 is deactivated before $t_1$, the controller 310 is activated at $t_1$. During TD1, the controller 310 activates the second voltage comparator 302. The term "during" a time delay as used here means the beginning and the expiration (i.e., the end) and any time in between. For example, the controller 310 may activate the second voltage comparator 302 at the expiration of TD1. If during TD1, the second voltage comparator 302 determines that the absolute value of the voltage equals or exceeds the absolute value of the second threshold V2 at time $t_2$, the controller 310 waits for stabilization of the voltage to stabilize. The voltage stabilizes at time $t_e$, when all charge carriers generated by the particle of radiation drift out of the radiation absorption layer 110. At time $t_s$, the time delay TD1 expires. At or after time $t_e$, the controller 310 causes the voltmeter 306 to digitize the voltage and determines which bin the energy of the particle of radiation falls in. The controller 310 then causes the number registered by the counter 320 corresponding to the bin to increase by one. In the example of FIG. 15, time $t_s$ is after time $t_e$; namely TD1 expires after all charge carriers generated by the particle of radiation drift out of the radiation absorption layer 110. If time $t_e$ cannot be easily measured, TD1 can be empirically chosen to allow sufficient time to collect essentially all charge carriers generated by a particle of radiation but not too long to risk have another incident particle of radiation. Namely, TD1 can be empirically chosen so that time $t_s$ is empirically after time $t_e$. Time $t_s$ is not necessarily after time $t_e$ because the controller 310 may disregard TD1 once V2 is reached and wait for time $t_e$. The rate of change of the difference between the voltage and the contribution to the voltage by the dark current is thus substantially zero at $t_e$. The controller 310 may be configured to deactivate the second voltage comparator 302 at expiration of TD1 or at $t_2$, or any time in between.

The voltage at time $t_e$ is proportional to the amount of charge carriers generated by the particle of radiation, which relates to the energy of the particle of radiation. The controller 310 may be configured to determine the energy of the particle of radiation, using the voltmeter 306.

After TD1 expires or digitization by the voltmeter 306, whichever later, the controller 310 connects the electric contact 119B to an electric ground for a reset period RST to allow charge carriers accumulated on the electric contact 119B to flow to the ground and reset the voltage. After RST, the system 121 is ready to detect another incident particle of radiation. If the first voltage comparator 301 has been deactivated, the controller 310 can activate it at any time before RST expires. If the controller 310 has been deactivated, it may be activated before RST expires.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
   obtaining a signal at a pixel in an array of pixels of a radiation detector, wherein the signal is generated from radiation incident on the radiation detector;
   obtaining a corrected signal by correcting the signal with a combination of a set of reference signals generated from the radiation at a set of reference pixels in the array, wherein a set of weights are respectively applied to the set of reference signals in the combination; and
   forming an image based on the corrected signal;
   wherein the set of weights is a function of a location of the pixel with respect to the array; and
   wherein each pixel in the array of pixels encompasses a portion of a radiation absorption layer of the radiation detector and the set of weights is a function of a thickness of the radiation absorption layer, or wherein the set of weights is a function of a direction of propagation of the radiation at the pixel.

2. The method of claim 1, wherein the signal is generated from charge carriers produced in the radiation absorption layer by the radiation.

3. The method of claim 1, wherein the set of weights is a function of relative positions of the set of reference pixels with respect to the pixel.

4. The method of claim 1, wherein the pixel is a member of the set of reference pixels.

5. The method of claim 1, wherein the radiation is X-ray or gamma ray.

6. The method of claim 1, wherein the signal and the set of reference signals are generated during the same time period.

7. The method of claim 1, wherein the combination is a sum of the set of reference signals with the set of weights applied thereto.

8. The method of claim 1, wherein the signal represents an intensity of the radiation at the pixel.

9. A computer program product comprising a non-transitory computer readable medium having instructions recorded thereon, the instructions when executed by a computer implementing a method of claim 1.

10. A system comprising:
    a radiation detector configured to generate a signal at a pixel in an array of pixels of the radiation detector from radiation incident on the radiation detector;
    a processor configured to obtain a corrected signal by correcting the signal with a combination of a set of reference signals generated from the radiation at a set of reference pixels in the array, wherein a set of weights are respectively applied to the set of reference signals in the combination;

wherein the processor is configured to form an image based on the corrected signal;

wherein the set of weights is a function of a location of the pixel with respect to the array; and wherein each pixel in the array of pixels encompasses a portion of a radiation absorption layer of the radiation detector and the set of weights is a function of a thickness of the radiation absorption layer, or wherein the set of weights is a function of a direction of propagation of the radiation at the pixel.

11. The system of claim 10, wherein the signal is generated from charge carriers produced in the radiation absorption layer by the radiation.

12. The system of claim 10, wherein the set of weights is a function of relative positions of the set of reference pixels with respect to the pixel.

13. The system of claim 10, wherein the pixel is a member of the set of reference pixels.

14. The system of claim 10, wherein the radiation is X-ray or gamma ray.

15. The system of claim 10, wherein the signal and the set of reference signals are generated during the same time period.

16. The system of claim 10, wherein the combination is a sum of the set of reference signals with the set of weights applied thereto.

17. The system of claim 10, wherein the signal represents an intensity of the radiation at the pixel.

* * * * *